Nov. 29, 1955  J. M. CARTER  2,725,556
DISTANCE AND DIRECTION INDICATING EQUIPMENT
Filed Feb. 3, 1950
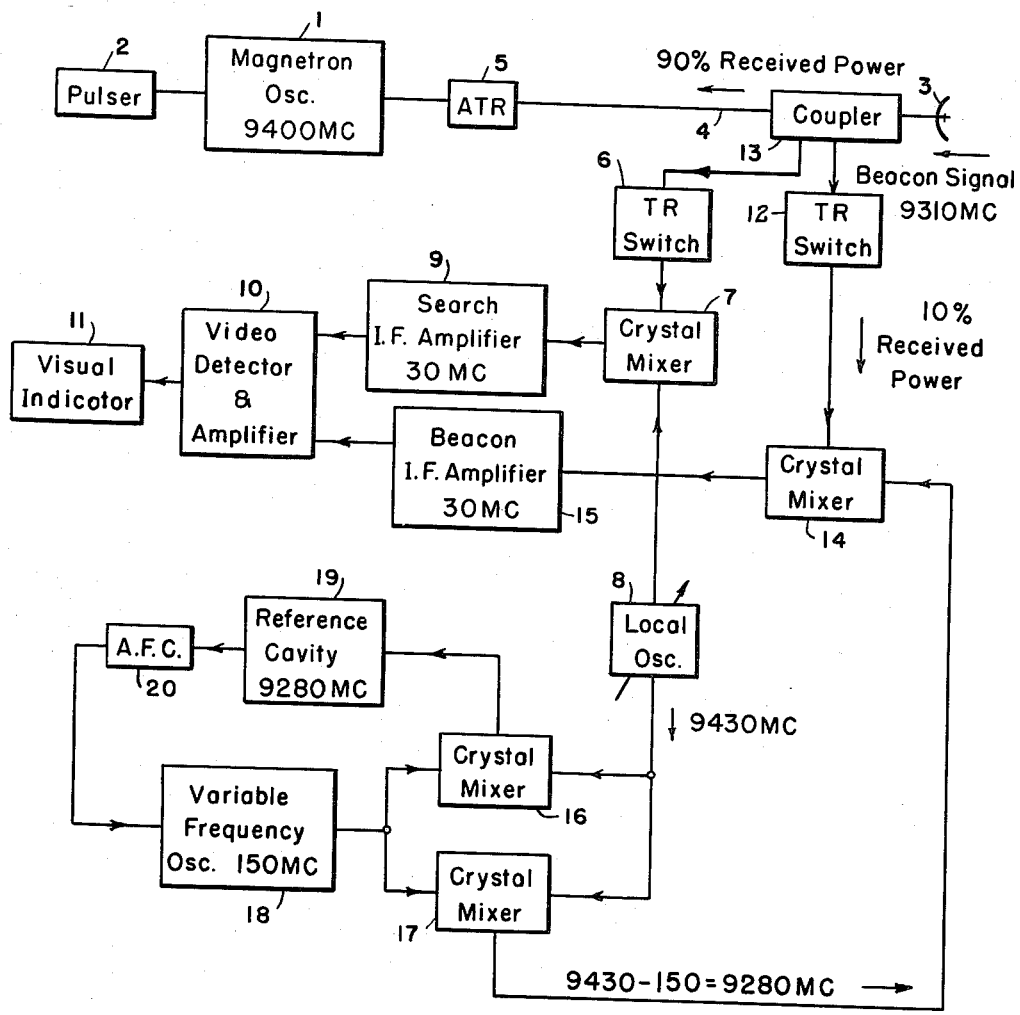
WITNESSES:
INVENTOR
John M. Carter.
BY
ATTORNEY

United States Patent Office 2,725,556
Patented Nov. 29, 1955

2,725,556

DISTANCE AND DIRECTION INDICATING EQUIPMENT

John M. Carter, Baltimore, Md., assignor to Westinghouse Electric Corporation, East Pittsburgh, Pa., a corporation of Pennsylvania Application February 3, 1950, Serial No. 142,169

10 Claims. (Cl. 343—17.1)

The present invention relates generally to radio distance and direction indicating equipment which is capable of simultaneous utilization for performing search functions and to furnish beacon signals for navigational purposes.

It has been a common practice in the prior art to utilize radio ranging (radar) equipments separately to furnish beacon signals for navigational purposes and to accomplish search functions, for the reason that beacon signals might be lost in the target returns if a given radar equipment were utilized simultaneously for search and beacon reception. It is frequently found to be advantageous operationally, however, to perform both search and beaconing functions simultaneously.

A radar beacon is a device which, upon reception of pulses transmitted by a radar equipment, triggers a transmitter which provides a strong response of one or more pulses which are independent of possible radar echoes from the vicinity of the beacon. The beacon operates as an amplifier of radar echoes, and need not be very powerful to be able to provide a response which is much greater than that obtained from normal targets. In order readily to enable discrimination between normal target responses and beacon responses, the beacon responses are established at a frequency differing from that of the normal radar transmitter.

The problem of simultaneous reception of normal echoes and beacon responses resolves itself then into a problem of receiving with high efficiency two signals of different frequencies, which may have very considerable differences in amplitudes, by means of receivers which are incorporated in radar equipments. While separate beacon and target echo receivers may be employed for the stated purposes, such duplication of receivers possesses many draw-backs, and the preferable solution accordingly involves utilization of but a single receiver. If a single receiver is employed, it is essential that the sensitivity of the receiver to echo signals be not affected because of its performance of the beacon reception function. Specifically, the receiver must operate at high sensitivity on search, but may have sensitivity as great as 40 db. down for reception of beacon returns.

It is an object of the present invention to provide a radar system which is capable of simultaneous performance of search and beacon reception functions.

It is a further and more specific object of the invention to provide a radar receiving system which is capable of simultaneous performance of search and beacon reception functions without noticeable reduction in the sensitivity of the radar equipment on search.

It is a more specific object of the invention to provide, in a radar search and beacon receiver which is capable of simultaneous operation for both search and beacon reception, a coupler which selectively distributes received search and beacon pulse energy.

It is a further object of the invention to provide a system of simultaneous search and beacon radar super-heterodyne reception wherein separate frequency converters are employed for search and beacon signals, the search converter deriving local oscillator signals from a tunable local oscillator, the frequency of which is heterodyned to provide beacon local oscillator signal, and in which provision is made for maintaining constant the frequency of the beacon local oscillator signal during tuning of the tunable local oscillator.

It is still another object of the invention to provide a directional coupler for channeling search energy to a search signal frequency converter and beacon energy to a beacon signal frequency converter, without substantial attenuation of the search signals.

It is still another specific object of the invention to provide a novel frequency control system for a radar search and beacon reception system which is capable of simultaneous operation for both search and beacon reception.

The above and still further objects and advantages of the present invention will become apparent upon consideration of the following detailed description of a specific embodiment thereof, especially when taken in conjunction with the accompanying drawing, wherein the single figure is a functional block diagram of a radar equipment embodying the invention.

Referring now specifically to the accompanying drawing, the reference numeral 1 identifies a magnetron oscillator, which is periodically pulsed by a pulser 2, and thereby caused to generate discrete radio frequency pulses. Transmissions from the magnetron oscillator 1 are transmitted to a directional antenna 3 via a wave guide, functionally represented by line 4. The usual ATR box 5 is provided, coupled to the wave guide 4, in conventional fashion, and performing its normal function in accordance with practices well understood in the art.

Coupled to the wave guide 4 via a directional coupler 13 and a T-R switch 6 is a crystal mixer 7, to which is also applied signal output from a local oscillator 8. The output of mixer 7 is applied to an I. F. amplifier 9. The T-R switch 6 performs its normal function of opening the circuit between coupler 13 and crystal mixer 7 while each pulse provided by magnetron oscillator 1 is traveling to antenna 3. Intermediate the transmitted pulses, or during reception periods, the T-R switch 6 operates to connect the coupler 13 to the crystal mixer 7. Thereby, the high power pulses transmitted by the magnetron oscillator 1 are prevented from burning out the crystal mixer 7, or overloading the I. F. amplifier 9, while echo signals are transmitted to the receiver section of the equipment.

The frequency of the local oscillator 8 is selected to differ from the frequency of the magnetron oscillator 1 by an amount equal to the desired frequency of the search intermediate frequency amplifier 9. The output of the I. F. amplifier 9 may be detected and amplified in a video detector and amplifier 10, the output of which is displayed on a visual indicator 11, which may comprise a cathode ray tube. The character of the indications provided by the visual indicator 11 and its mode of operation, form no part of the present invention, and may be of conventional character in radar systems.

The details of the specific system above disclosed are suitable, in general, for use in a conventional radar receiver. If desired the local oscillator 8 may be provided with automatic frequency control, in accordance with principles known in the art, for the purpose of maintaining suitable frequencies at oscillator 8 for all values of magnetron oscillator frequency. Thereby the performance of the receiver system during search is optimized automatically, and without requiring manual tuning. In any event provision is made for manual tuning of oscillator 8, to accommodate a range of operating frequencies.

The wave guide 4 is coupled to a second T-R switch 12, coupling between wave guide 4 and T-R switch 12 being accomplished by means of the directional coupler 13 which also couples the wave guide to T-R switch 6. The latter is capable of channeling radio frequency energy without substantial attenuation, and serves to transfer the greater part of received energy to T-R switch 6, and the small remaining part to T-R switch 12. The design of the coupler 13 is such that sufficient transmitted energy is passed from wave guide 4 to T-R switch 12 to actuate the latter to block the path to mixer 14 in response to each transmitted pulse. This has been accomplished, in a practical case, by designing the coupler 13 to pass 90% of the energy along the wave guide 4 and 10% into the branch containing the T-R switch 12. This design results in transmission of 90% of received search energy to the search signal mixer 7 via T-R switch 6, and hence results in negligible loss of search reception efficiency. At the same time 10% of beacon signal energy is applied to mixer 14 via T-R switch 12, which is sufficient for effective operation, having regard for the high normal amplitude of beacon signals.

The search signals are highly attenuated in the path leading to the beacon signal mixer 14, without absorption of search energy, nevertheless, a factor which adds greatly to the search reception efficiency of the present system. The beacon signal which is applied to crystal mixer 14 is frequency converted therein to a frequency suitable for amplification in I. F. amplifier 15. The output of the I. F. amplifier 15 is thus restricted to beacon responses, to the substantial exclusion of search echo responses, and is applied to video detector and amplifier 16, where it is combined with the output of search I. F. amplifier 9, and is displayed on visual indicator 11.

While the choice of couplers and of attenuations introduced thereby represents a compromise in view of various factors, I have found, in one practical embodiment of my invention, that at 10 db. directional coupler may be employed with satisfactory results. Suitable couplers for the purpose are disclosed in Chapter 14 of "Technique of Microwave Measurements," No. 11 of the Radiation Laboratory Series, published by McGraw-Hill Book Co., Inc. in 1947. Specific examples of couplers which will operate satisfactorily in the disclosed system are illustrated in Figs. 14.4; 14.23; 14.29; and 14.43 of this textbook. The couplers are connected into the circuit in a manner well known in the art, as described in the above referenced textbook. The coupler utilized in the cited example provides, then, a 10% transmission of received power from antenna 3 to T-R switch 12, and 90% of received power from antenna 3 to T-R switch 6. It is found in practice that the stated attenuation in the direction of T-R switch 12 is not sufficient to prevent operation of T-R switch 12 in response to transmitted pulses but leaves sufficient power in received beacon pulses to provide satisfactory visual displays.

In general, beacon return signals are on a different frequency than is transmitted by the radar equipment which triggers the beacon transmitter, and normally are at fixed frequency, while the pulses transmitted by a radar equipment may vary considerably in frequency, from time to time. In a practical embodiment of my invention the magnetron oscillator 1 is assumed to oscillate at 9400 mc. and the search I. F. amplifier 9 is tuned to 30 mc. Search local oscillator 8 is required, then, to provide output at 9430 mc. A common beacon frequency may be, for example, 9310 mc. Suitable local frequency for application to mixer 14 is then 9280 mc., to enable utilization of a 30 mc. beacon I. F. amplifier 15 by frequency conversion of beacon signal in crystal mixer 14. Since the frequency of magnetron oscillator 1 may, in fact, have any value within a considerable range of values, in the vicinity of 9400 mc., the local frequency supplied for frequency conversion purposes by oscillator 8 must be variable.

In accordance with the present invention I apply the output of local oscillator 8 to a crystal mixer 16 and to a crystal mixer 17. To the crystal mixer 17 I further apply a signal provided by a variable frequency oscillator 18, which may be assumed to generate oscillations at 150 mc. when the received beacon signals are at 9310 mc., or in accordance with the exemplary values provided. The crystal mixer provides a difference frequency of 9280 mc., which is applied to crystal mixer 14, and serves to convert beacon signals at 9310 mc. to 30 mc.

Simultaneously the output of local oscillator 8 and of variable frequency oscillator 18 are applied to crystal mixer 16, which supplies a conversion product at 9280 mc. to a reference resonant cavity 19, fixed tuned to 9280 mc. The response of the reference cavity 19 is a function of the deviation of the output of crystal mixer 16 from 9280 mc., and is applied to A. F. C. circuit 20, which supplies control signals to variable frequency oscillator 18 to control the output thereof. Any variation of frequency of local oscillator 8, to correspond with variations of frequency of magnetron oscillator 1, accordingly gives rise to control signal output from A. F. C. circuit 20, which varies the frequency of oscillator 18 to re-establish a suitable conversion frequency for crystal mixer 14.

The reference cavity may be tunable, to enable reception of beacon signals differing from 9310 mc., the value cited as exemplary, if desired. Nevertheless, in accordance with current practice, beacon signals are transmitted on a single invariable frequency. Magnetron tubes, in accordance with current practice, are not all of identical frequency, and may be tunable in order to avoid interference between radar equipments. Local oscillator 8 is accordingly required to be tunable to correspond with the magnetron frequency employed. In accordance with the present system, variations of tuning of local oscillator 8 is automatically compensated for, so that optimum reception of beacon signals occurs for all frequencies of oscillator 8, provided the frequency range of oscillator 18, and of its A. F. C. circuit 20, is adequate. Since the conversion frequency supplied to crystal mixer 14 by crystal mixer 17 is derived in part from a relatively low frequency oscillator 18, the sensitivity of adjustment of the beacon reception channel, in the present system, is considerably enhanced.

While I have disclosed a directional coupler 13 in the transmission line 4, as a preferred embodiment of the invention, it will be clear that an attenuator between transmission line 4 and T-R switch 12 may be employed in substitution for the coupler, with no significant modification in overall mode of operation of the system, although with considerable loss in efficiency. Thereby the beacon pulses will be attenuated to suitable values, while the normal echo responses will pass to the T-R switch 6 and crystal mixer 7. The normal echo response power will, however, be subject to loss in the attenuator which parallels the path to the T-R switch 6, which is highly undesirable.

While I have described one specific embodiment of the present invention, it will be clear that variations thereof may be resorted to, in respect both to general arrangement and in respect to details of circuit, without departing from the true spirit and scope of the invention as defined by the appended claims.

I claim as my invention:

1. A combined search and beacon radar receiver, comprising, a first channel for receiving search signals at a first frequency, said first channel comprising a first frequency converter including a tunable oscillator, a second channel for beacon signals at a second frequency different from said first frequency, said second channel comprising a further frequency converter having a source of local oscillations, said source of local oscillations comprising a mixer, a variable source of auxiliary oscillations, and means for coupling said source of auxiliary oscillations and said tunable oscillator to said mixer for generation of said local oscillations.

2. A combined search and beacon radar receiver, comprising, a first channel for receiving search signals falling within a predetermined band of frequencies, said first channel comprising a first frequency converter for said predetermined band of frequencies, said first frequency converter including a tunable oscillator, a second channel for beacon signals at a frequency falling without said predetermined band of frequencies, said second channel comprising a further frequency converter having a source of local oscillations, said source of local oscillations comprising a mixer, a source of auxiliary oscillations, means for coupling said source of auxiliary oscillations and said tunable oscillator to said mixer for generation therein of said local oscillations, and means for varying the frequency of said auxiliary oscillations in response to tuning of said tunable oscillator to maintain at a desired value the frequency of said local oscillations.

3. A combined search and beacon radar receiver, comprising, a first channel for receiving search signals falling within a predetermined band of frequencies, said first channel comprising a first frequency converter for said predetermined band of frequencies, said first frequency converter including a tunable oscillator, a second channel for beacon signals at a frequency falling without said predetermined band of frequencies, said second channel comprising a further frequency converter having a source of local oscillations, said source of local oscillations comprising a mixer, a source of auxiliary oscillations, means for coupling said source of auxiliary oscillations and said tunable oscillator to said mixer for generation therein of said local oscillations, and means for varying the frequency of said auxiliary oscillations in response to tuning of said tunable oscillator to maintain at a desired value the frequency of said local oscillations, said means for varying the frequency of said auxiliary oscillations comprising a fixed tuned circuit, means for coupling signal at the frequency of said local oscillations to said fixed tuned circuit, said fixed tuned circuit tuned to said desired frequency of said local oscillations, and an automatic frequency control device responsive to the response of said fixed tuned circuit to said signal at the frequency of said local oscillations for tuning said source of auxiliary oscillations to maintain at said desired value the frequency of said local oscillations.

4. In a combined search and beacon radar receiver, arranged for simultaneous performance of search and beacon reception, wherein search and beacon frequencies are substantially different, means for converting one of said frequencies to a further fixed frequency comprising a tunable local oscillator, and a separate converter for converting the other of said frequencies to said further fixed frequency, said separate converter comprising a source of local oscillations of invariable frequency, said source of local oscillations comprising said tunable local oscillator and frequency converting means for converting the frequency of said tunable local oscillator to said invariable frequency for all frequencies of said tunable local oscillator.

5. In a combined search and beacon pulse radar receiver, arranger for simultaneous performance of search and beacon reception, wherein search and beacon frequencies are substantially different, and wherein the amplitude of beacon signals is radically greater than the amplitude of normal echo signals, a single receiving antenna, means responsive to echo signals received by said antenna for converting said echo signals in frequency to a further fixed frequency, said means for converting comprising a tunable local oscillator, means for substantially attenuating said beacon signals to approximately the amplitude of said echo signals, means for converting the frequency of said beacon signals to said further fixed frequency, said last named means for converting comprising a source of local oscillations of invariable frequency, said source of local oscillations comprising said tunable local oscillator and means for converting the frequency of said tunable local oscillations to said invariable frequency for all frequencies of said tunable oscillator.

6. In a combined search and beacon pulse radar receiver, arranged for simultaneous performance of search and beacon reception, wherein search and beacon frequencies are substantially different, and wherein the amplitude of beacon signals is radically greater than the amplitude of normal echo signals, a single receiving antenna, means responsive to echo signals received by said antenna for converting said echo signals in frequency to a further fixed frequency, said means for converting comprising a tunable local oscillator, means for substantially attenuating said beacon signals to approximately the amplitude of said echo signals, means for converting the frequency of said beacon signals to said further fixed frequency, said last named means for converting comprising a source of local oscillations of invariable frequency, said source of local oscillations comprising said tunable local oscillator and means for converting the frequency of said tunable local oscillations to said invariable frequency for all frequencies of said tunable oscillator, said last means for converting comprising a mixer, a source of auxiliary oscillations of variable frequency, means for applying to said mixer said auxiliary oscillations, means for coupling said local oscillator to said mixer, means for deriving from said mixer said local oscillations, and means responsive to variations of tuning of said tunable local oscillator for varying the frequency of said auxiliary oscillations to maintain invariability of frequency of said local oscillations.

7. In a system for converting the variable frequency of a first signal and the fixed frequency of a second signal to a common frequency, the combination of a tunable local oscillator, a first device responsive to the output of said oscillator for converting the variable frequency of said first signal to said common frequency, an auxiliary frequency source, a second device responsive to the output of said oscillator over its entire tuning range and said auxiliary frequency source for generating a signal of constant frequency, and a third device responsive to the constant frequency signal output of said second device for converting the frequency of said second signal to said common frequency.

8. A combined search and beacon radar equipment, comprising, a pulse oscillator, a radiant energy transmission channel, a directional coupler and an antenna coupled in cascade to said pulse oscillator, said directional coupler arranged to transmist a major portion of said radiant energy to said antenna, a first receiving channel comprising a transmit-receive switch coupled to said transmission channel between said pulse oscillator and said directional coupler, a second receiving channel comprising a transmit-receive switch coupled to said directional coupler, said directional coupler adapted and arranged to transfer a minor portion of said radiant energy to said second receiving channel.

9. A combined search and beacon radar receiver, comprising, a first channel for receiving search signals at a first frequency, a second channel for receiving beacon signals at a second frequency different from said first frequency, a single antenna, a signals transmision channel coupled to said antenna, and a directional coupler from said signals transmission channel to said first and second transmission channel for controlling a division of energy flow to said first and second channels from said signals transmision channel, said first channel comprising a first frequency converter including a tunable oscillator, said second channel comprising a further frequency converter having a source of local oscillations, said source of local oscillations comprising a mixer, a source of auxiliary oscillations, and means for coupling said source of auxiliary oscillations and said tunable oscillator to said mixer for generation of said local oscillations.

10. A combined search and beacon radar receiver, comprising, a first channel for receiving search signals at a first frequency, a second channel for receiving beacon signals at a second frequency different from said first frequency, a single antenna, a signals transmission channel coupled to said antenna, and a directional coupler from said signals transmission channel ot said first and second transmission channel for controlling a division of energy flow to said first and second channels from said signals transmission channel, said first channel comprising a first frequency converter including a tunable oscillator, said second channel comprising a further frequency converter having a source of local oscillations, said source of local oscillations comprising a mixer, a source of auxiliary oscillations, and frequency control means for varying the frequency of said auxiliary oscillations in response to tuning of said tunable oscilator so as to maintain at a constant desired value the frequency of said local oscillations.

References Cited in the file of this patent

UNITED STATES PATENTS

| | | |
|---|---|---|
| 2,129,020 | Murphy | Sept. 6, 1938 |
| 2,288,025 | Pomeroy | June 30, 1942 |
| 2,317,547 | McRae | Apr. 27, 1943 |
| 2,434,646 | Fox | Jan. 20, 1948 |
| 2,452,601 | Ranger | Nov. 2, 1948 |
| 2,462,841 | Bruck et al. | Mar. 1, 1949 |
| 2,484,798 | Bradley | Oct. 11, 1949 |
| 2,530,979 | Matland et al. | Nov. 21, 1950 |
| 2,547,945 | Jenks | Apr. 10, 1951 |
| 2,549,131 | Rideout | Apr. 17, 1951 |
| 2,574,055 | Ortusi et al. | Nov. 6, 1951 |
| 2,633,492 | Ring | Mar. 31, 1953 |

OTHER REFERENCES

"Principles of Radar" by M. I. T. Staff. Published by McGraw-Hill Book Co., Inc., New York and London (1946), 2nd Edition, 2nd impression. (Copy in Div. 51.)